United States Patent Office 2,930,738
Patented Mar. 29, 1960

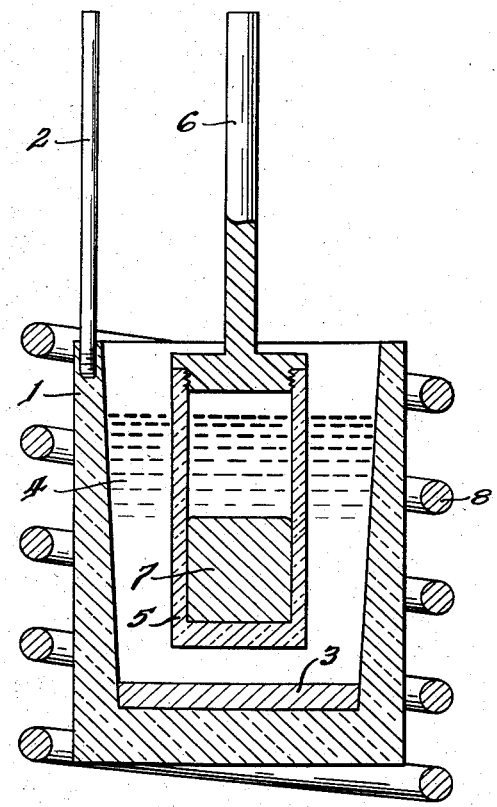

2,930,738

REGENERATION OF REACTOR FUEL ELEMENTS

William E. Roake and Ward L. Lyon, Benton County, Wash., assignors to the United States of America as represented by the United States Atomic Energy Commission Application June 24, 1958, Serial No. 744,299

1 Claim. (Cl. 204—1.5)

This invention deals with a process of regenerating metallic fuel elements containing plutonium and/or uranium as the fissionable material, and in particular with aluminum alloys containing said fissionable material.

Aluminum alloys of the type described are used, for instance, as the fuel material of power reactors, such as the so-called plutonium recycle test reactor; this reactor is described, for instance, in report HW–50700 published by General Electric Company. In these reactors the fissionable material is burned up usually to a maximum degree of about 50%, but preferably to a lesser extent. The quasi depleted aluminum alloys have to be reconditioned for economical reasons, that is, the plutonium content has to be brought up to a higher level to make the alloys suitable for reuse in reactors.

It is an object of this invention to provide a process for the concentration of uranium or plutonium in aluminum alloys wherein an intermediate step of forming an aqueous solution is not necessary.

Another object of this invention is a process for concentrating plutonium or uranium in aluminum alloys that have been subjected to neutron bombardment in a neutronic reactor which process requires handling of small volumes of masses only, so that the process can be carried out in a small plant space and with relatively little shielding.

It is still another object of this invention to provide a process for concentrating plutonium or uranium in neutron-bombarded fission-products-containing aluminum alloys in which the fission products are obtained in a highly concentrated form so that their disposal is comparatively easy.

It is also an object of this invention to provide a process for concentrating plutonium or uranium in neutron-bombarded aluminum alloys in which process the fuel alloy is retained in the metallic state during reconditioning so that steps of metal production are not necessary.

It is also an object of this invention to provide a process for concentrating plutonium and/or uranium in neutron-bombarded aluminum alloys which does not require a great number of steps, but is relatively simple and economical.

It is finally also an object of this invention to provide a process for concentrating plutonium and/or uranium in neutron-bombarded aluminum alloys which can be carried out easily by remote control.

These objects are accomplished by subjecting the fused aluminum alloy containing the uranium and/or plutonium to electrolysis, making the alloy the anode and using a fused aluminum fluoride-containing material as the electrolyte. In this process some of the aluminum travels to the cathode, but the greater part thereof is oxidized by the air of the atmosphere to aluminum oxide which is dissolved in the electrolyte.

While the electrolyte can be any material containing a substantial amount of aluminum fluoride, cryolite is the preferred substance. The material of the cathode may vary widely; aluminum and graphite have been found to be particularly well suitable. The cathode and the anode can be separated from each other by a porous membrane as is customary in the art of electrolysis. However, another way of accomplishing separation is by arranging the electrodes and electrolyte in layers so that the electrolyte separates cathode and anode. For instance, in a nonconducting container the bottom layer can be formed of the fused plutonium alloy to be treated which then will be made the anode. An intermediate layer of fused electrolyte is then superimposed on the bottom anode layer and the top layer of fused aluminum is arranged thereabove and cathodically connected. In order to obtain well separated strata, it is sometimes necessary to add a density modifier to the electrolyte; this, of course, is dependent on the composition of the plutonium-aluminum alloy and on that of the electrolyte. Suitable density modifiers are, for instance, aluminum fluoride or barium fluoride.

The operating temperature is dependent on the melting point of the materials and thus on their composition and, apart from this, is not critical.

One apparatus successfully used for carrying out the process of this invention is shown in the accompanying drawing in the form of a diagrammatical, longitudinal section.

In this drawing the reference numeral 1 designates a crucible, for instance graphite, which is connected with a lead 2; this crucible 1 contains the cathode metal 3 which preferably is aluminum. An electrolyte 4 floats on top of the cathode metal 3. A porous graphite container 5, connected with a lead 6, is suspended in the electrolyte 4 without contacting the crucible 1. The container 5 contains molten anode alloy 7 to be concentrated in fissionable material. Induction coils 8 surround the entire unit to bring the materials to the temperatures desired.

As has been mentioned above, some of the aluminum removed from the alloy is deposited on the cathode while the other fraction is oxidized and dissolved in the electrolyte as aluminum oxide. Frequently the aluminum at the cathode is slightly contaminated with plutonium. This plutonium removal from the anode alloy and deposition on the cathode, of course, means a reduction of the efficiency of the process; however, it does not represent a loss, because the plutonium-containing cathode alloy can be used as reducing agent in the preparation of metallic plutonium from its compounds and thus the plutonium can be recovered from the cathode alloy. The electrolyte was found always to be plutonium-free, which probably is due to the reduction of any plutonium compound that might have formed with metallic aluminum.

By the electrolysis a certain degree of decontamination from fission products is also obtained. Some of the fission products are volatilized at the temperature used for the electrolysis. A great fraction of the fission products, and in particular the lanthanide rare earth fission products, are oxidized by the air and the oxides formed are extracted into the electrolyte. Most fission products stay in the reduced state and only a few of them are deposited on the cathode.

In the following, a few examples are given for the purpose of illustrating the process of this invention.

*Example 1*

A sample of 22.4 gm. of a uranium-aluminum alloy containing 0.74% by weight of uranium was electrolyzed for 24 ampere-hours using graphite as cathode material. The apparatus shown in the drawing was used. The electrolyte was cryolite; it was maintained at a temperature of about 970° C. The anode alloy had been enriched to a uranium content of 1.17% by weight. The aluminum that had been removed from the anode had practically all been dissolved as aluminum oxide in the cryolite.

*Example II*

In this instance the cathode consisted of 10 gm. of pure aluminum metal. The same alloy as in Example I was used in an amount of 17.15 gm. After electrolysis for 26 ampere-hours the alloy had been enriched to 2% or uranium. The cathode did not show a significant uranium content.

*Example III*

A graphite crucible containing a layer of 46 gm. of molten aluminum metal and a layer of cryolite maintained at a temperature of between 1015 and 1035° C. thereover were arranged as illustrated in the drawing; the aluminum metal was made the cathode. A graphite cup containing 23.15 gm. of a molten aluminum alloy was suspended by a graphite rod; the alloy contained 1.54% of plutonium. An electric current of 8.0 amperes was passed through the cell for 2¾ hours.

After the electrolysis the anode alloy weighed 18.0 gm. and contained 1.82% of plutonium; this amounted to an enrichment of 18%. The cathode alloy weighed 41.5 gm. and had a plutonium content of 0.0427%. Part of the aluminum of the anode alloy had been oxidized by the air to aluminum oxide which was dissolved in the electrolyte.

While the process of this invention has been illustrated on binary aluminum alloys containing uranium and plutonium, respectively, as the secondary component, the process of this invention is equally well applicable to other uranium- or plutonium-containing aluminum alloys. For instance, the process is suitable for the concentration of silicon-containing aluminum alloys which contain the fissionable materials mentioned above.

It will be understood that this invention is not to be limited to the details given herein, but that it may be modified within the scope of the appended claim.

What is claimed is:

A process of concentrating the actinide content in an aluminum alloy containing actinide selected from the group consisting of uranium, plutonium and a mixture of the two, comprising making said alloy the anode of an electric circuit comprising said anode, an aluminum cathode and an electrolyte, contacting said alloy with molten cryolite as the electrolyte, and electrolyzing the alloy for from 22 to 26 ampere-hours whereby aluminum is removed therefrom and an alloy having an increased actinide concentration is obtained.

References Cited in the file of this patent

UNITED STATES PATENTS

| | | |
|---|---|---|
| 1,534,317 | Hoppes et al. | Apr. 25, 1925 |
| 2,598,777 | Frary | June 3, 1952 |